US012665098B2

(12) United States Patent
Moon et al.

(10) Patent No.: US 12,665,098 B2
(45) Date of Patent: Jun. 23, 2026

(54) REACTOR COOLING SYSTEM FOR DISASTER ACCIDENT, AND REACTOR COOLING METHOD USING SAME

(71) Applicant: KOREA HYDRO & NUCLEAR POWER CO., LTD., Gyeongju-si (KR)

(72) Inventors: Ho Rim Moon, Sejong (KR); Sang Hee Kang, Daejeon (KR); Huiun Ha, Daejeon (KR)

(73) Assignee: Korea Hydro & Nuclear Power Co., Ltd., Gyeongju-si (KR)

( * ) Notice: Subject to any disclaimer, the term of this patent is extended or adjusted under 35 U.S.C. 154(b) by 465 days.

(21) Appl. No.: 18/016,556

(22) PCT Filed: Jul. 12, 2021

(86) PCT No.: PCT/KR2021/008917
§ 371 (c)(1),
(2) Date: Jan. 17, 2023

(87) PCT Pub. No.: WO2022/019554
PCT Pub. Date: Jan. 27, 2022

(65) Prior Publication Data

US 2023/0307150 A1 Sep. 28, 2023

(30) Foreign Application Priority Data

Jul. 21, 2020 (KR) ........................ 10-2020-0090162

(51) Int. Cl.
*G21C 15/18* (2006.01)
*G21C 15/243* (2006.01)

(52) U.S. Cl.
CPC ......... *G21C 15/182* (2013.01); *G21C 15/243* (2013.01)

(58) Field of Classification Search
None
See application file for complete search history.

(56) References Cited

U.S. PATENT DOCUMENTS 5,657,360 A 8/1997 Muta et al.
10,115,488 B2 * 10/2018 Han ....................... G21C 1/322

FOREIGN PATENT DOCUMENTS

JP S54-145045 A 11/1979
JP 08-146184 A 6/1996
JP 10-020081 A 1/1998

(Continued)

*Primary Examiner* — Lily C Garner
(74) *Attorney, Agent, or Firm* — You & IP, LLC

(57) ABSTRACT

Proposed is a reactor cooling system for cooling down a reactor damaged by a disaster accident and a reactor cooling method using same using contaminated water generated at a nuclear reactor as a cooling water source for cooling the nuclear reactor after the accident, thereby maximally suppressing discharge of the contaminated water into the sea. To this end, the reactor cooling system prosed above includes a nuclear power generation facility, a seawater storage tank, a seawater inflow flow path for introducing the seawater into the seawater storage tank and a seawater discharge flow path for discharging the seawater from the seawater storage tank to the sea, connected to one end and another end of the seawater storage tank, respectively, a heat exchanger installed in a water storage space of the seawater storage tank, a contaminated water supply flow path, and a contaminated water discharge flow path.

2 Claims, 3 Drawing Sheets

(56) References Cited

FOREIGN PATENT DOCUMENTS

| | | | | |
|---|---|---|---|---|
| JP | 2001004791 | A | | 1/2001 |
| JP | 2012-230085 | A | | 11/2012 |
| JP | 2013154781 | A | | 8/2013 |
| KR | 10-1241142 | B1 | | 3/2013 |
| KR | 20140047452 | A | * | 4/2014 |
| KR | 10-2014-0061846 | A | | 5/2014 |
| KR | 10-1742290 | B1 | | 5/2017 |
| KR | 10-2019-0116852 | A | | 10/2019 |
| KR | 20190116852 | A | * | 10/2019 |

* cited by examiner

REACTOR COOLING SYSTEM FOR DISASTER ACCIDENT, AND REACTOR COOLING METHOD USING SAME

TECHNICAL FIELD

The present disclosure relates to a reactor cooling system for cooling down a reactor damaged by a disaster accident and a reactor cooling method using same and, more particularly, to a reactor cooling system for cooling down a reactor damaged by a disaster accident and a reactor cooling method using same using contaminated water generated at a nuclear reactor as a cooling water source for cooling the nuclear reactor after the accident.

BACKGROUND ART

In general, a nuclear power plant is divided into a nuclear steam supply system (NSSS) centered on a nuclear reactor, a turbine that receives steam and turns a generator, a generator system, and other auxiliary facilities. The nuclear reactor is used for generating steam by using thermal energy generated by chain fission reactions and for rotating a turbine using the steam to produce electricity through such a process. Here, when control of combustion of nuclear fuel fails, or a cooling system is stopped due to a tsunami and the like, as was the case in the Chernobyl nuclear power plant accident in 1986 or the Fukushima nuclear power plant accident in 2011, respectively, a reactor core may be damaged due to overheating, and an explosion within the reactor may occur. Accordingly, a power generating system using a nuclear reactor may also have risks causing damage to an external environment such as leakage of a large amount of radioactive material and the like.

When a severe accident occurs at a nuclear power plant, nuclear fuel in the core is melted down, and the reactor is damaged, which may cause corium, which is radioactive and high-temperature, to be discharged. At this time, the discharged corium is an ultra-high temperature radioactive material with a temperature of over 2000 K degrees and has a characteristic of continuously generating heat. Therefore, when proper cooling of the discharged corium is not performed, the reactor compartment built with a concrete structure may be damaged by the discharged corium, and radioactive material may leak to the outside. In this way, the surrounding environment of the nuclear power plant may be contaminated when radioactive material leaking: from the reactor compartment is released into the soil or air. Furthermore, a severe accident may threaten the stability of the containment building of the nuclear reactor, which may pose a severe risk to human health. Therefore, efforts have been made to confine and cool the corium discharged from the reactor vessel due to a severe accident.

On the other hand, in order to cool a nuclear reactor and a nuclear reactor building after the accident, an enormous cooling water source is required, and seawater is unavoidably used as the cooling water source. However, when the nuclear reactor and reactor building are directly cooled using seawater, there may be a problem in that contaminated water containing radioactive materials may be directly released into the sea as in Japan's response after the Fukushima accident, which may act as a threatening factor aggravating environmental contamination as well as provoking sentiments in neighboring countries.

DOCUMENTS OF RELATED ART

Patent Document

Korean Patent No. 10-1742290

DISCLOSURE

Technical Problem

Accordingly, the present disclosure has been made keeping in mind the above problems occurring in the related art, and an objective of the present disclosure is to provide a reactor cooling system for cooling down a reactor damaged by a disaster accident and a reactor cooling method using same, which allow high-temperature contaminated water generated at a nuclear power plant to be heat-exchanged with seawater after the accident, so that contaminated water heat-exchanged may be used as cooling water, thereby suppressing the discharge of contaminated water into the sea in a process of coping with the accident.

Technical Solution

In order to accomplish the above objective, there may be provided a reactor cooling system for cooling down a reactor damaged by a disaster accident, the system including: a nuclear power generation facility; a seawater storage tank provided with a water storage space to store seawater; a seawater inflow flow path provide d with a pipeline capable of introducing the seawater into the seawater storage tank and a seawater discharge flow path provide d with a pipeline for discharging the seawater from the seawater storage tank to the sea, the seawater inflow flow path and the seawater discharge flow path being connected to one end and another end of the seawater storage tank, respectively; a heat exchanger installed in the water storage space of the seawater storage tank; a contaminated water supply flow path provided with a pipeline for transferring contaminated water generated at the nuclear power generation facility after the accident to the heat exchanger therethrough; and a contaminated water discharge flow path between the heat exchanger and the nuclear power generation facility provided with a pipeline for discharging the contaminated water, heat-exchanged with the seawater inside the seawater storage tank, to the nuclear power generation facility.

In this case, the contaminated water generated at the nuclear power generation facility may circulate through the nuclear power generation facility and the heat exchanger, and the seawater may circulate through the sea and the seawater storage tank.

In addition, the heat exchanger may be stacked in the vertical direction of the seawater storage tank to increase contact areas between the contaminated water and the seawater through the heat exchanger.

In this case, the heat exchanger may be integrally provided in zigzag directions and inclined with respect to a bottom part of the seawater storage tank.

As another example to accomplish the above objective, there may be provided a reactor cooling method using a reactor cooling system for cooling down a reactor damaged by a disaster accident, the method including: circulating contaminated water generated at a nuclear power generation facility after the accident between the heat exchanger and the nuclear power generation facility; circulating seawater between the sea and the seawater storage tank; and spraying the contaminated water heat-exchanged into the nuclear power generation facility.

In this case, the contaminated water falls freely from a top part to a bottom along a slope of the heat exchanger stacked and may be discharged toward the nuclear power generation facility through a pump.

Advantageous Effects

As described above, a reactor cooling system for cooling down a reactor damaged by a disaster accident and a reactor cooling method using same according to the present disclosure can allow high-temperature contaminated water generated at a nuclear reactor to be heat-exchanged with seawater for cooling a nuclear reactor after the accident, thereby allowing the contaminated water to be used as a cooling water source. That is, while allowing the contaminated water to be continuously heat-exchanged with seawater through heat exchanger without being discharged into the sea, the present disclosure can allow the contaminated water to be used as cooling water. Accordingly, the present disclosure has an effect of maximally suppressing discharge of the contaminated water into the sea during a cooling operation of the nuclear reactor following an occurrence of the accident.

BEST MODE

Terms or words used in the present specification and claims are not limited to usual or dictionary meanings and, on the basis of a principle that the inventors may properly define a concept of the terms to explain the invention thereof in the best way, should be interpreted as a meaning and concept consistent with the technical spirit of the present disclosure.

Figure 2:
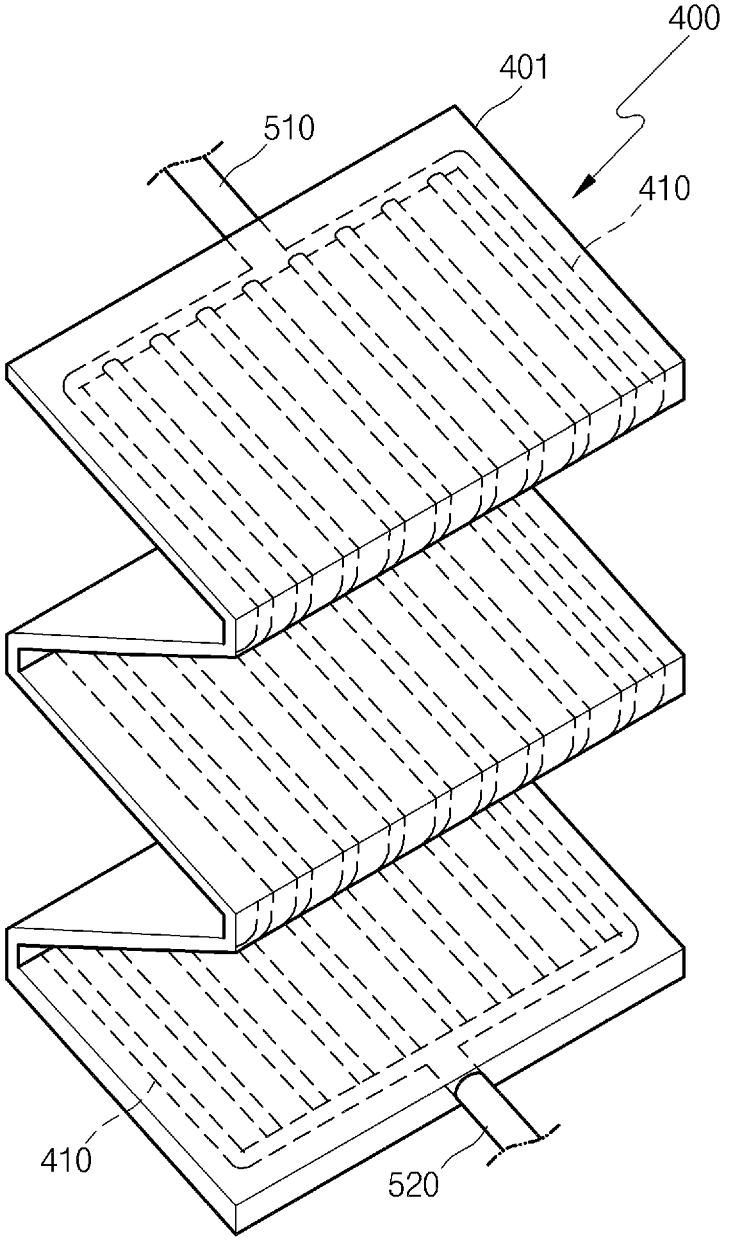
FIG. 2 is a view showing heat exchanger of the reactor cooling system for cooling down a reactor damaged by a disaster accident according to the exemplary embodiment of the present disclosure.
Figure 3:
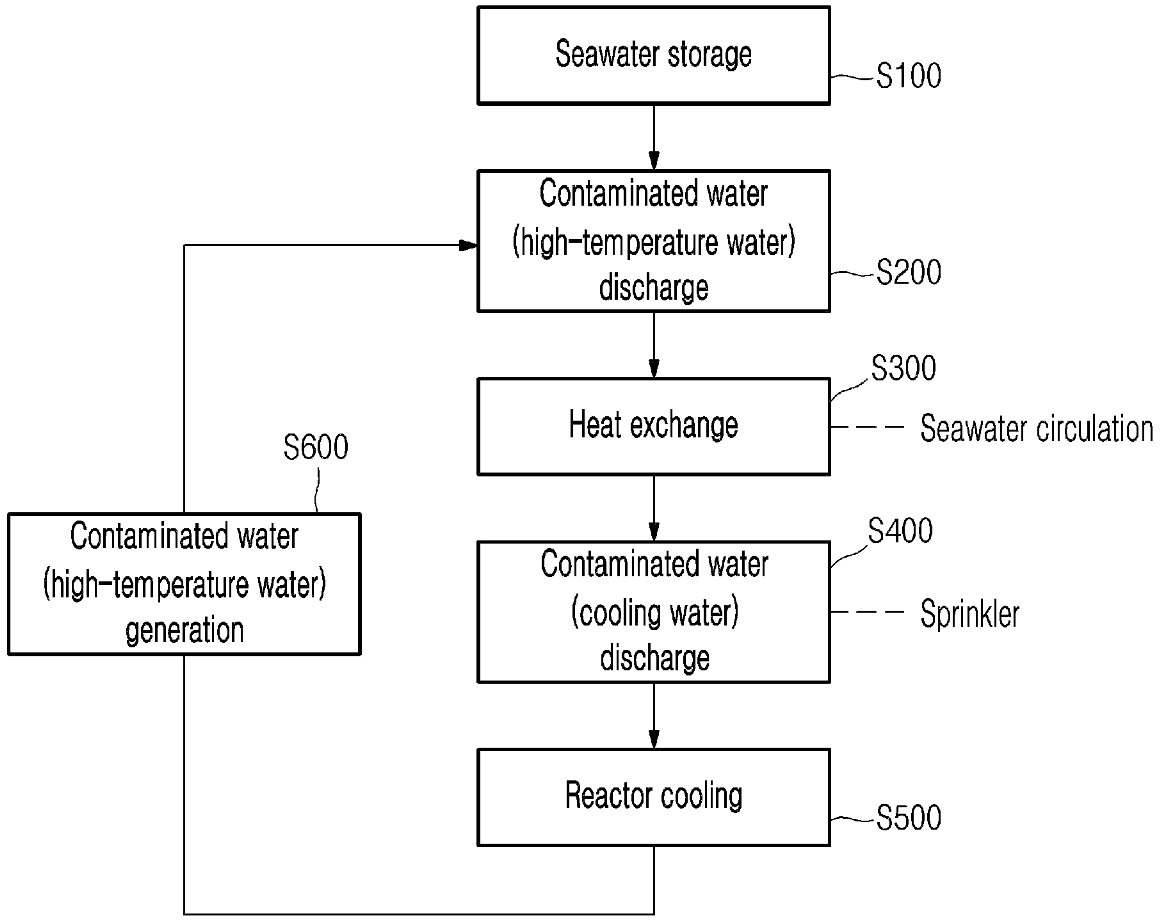
FIG. 3 is a flowchart showing a reactor cooling method using the reactor cooling system for cooling down a reactor damaged by a disaster accident according to the exemplary embodiment of the present disclosure.

Hereinafter, a reactor cooling system for cooling down a reactor damaged by a disaster accident and a reactor cooling method using same according to an exemplary embodiment of the present disclosure will be described with reference to FIGS. 1 to 3 attached hereto. First, the reactor cooling system for cooling down a reactor damaged by a disaster accident according to the exemplary embodiment of the present disclosure will be described with reference to FIGS. 1 and 2.

Figure 1:
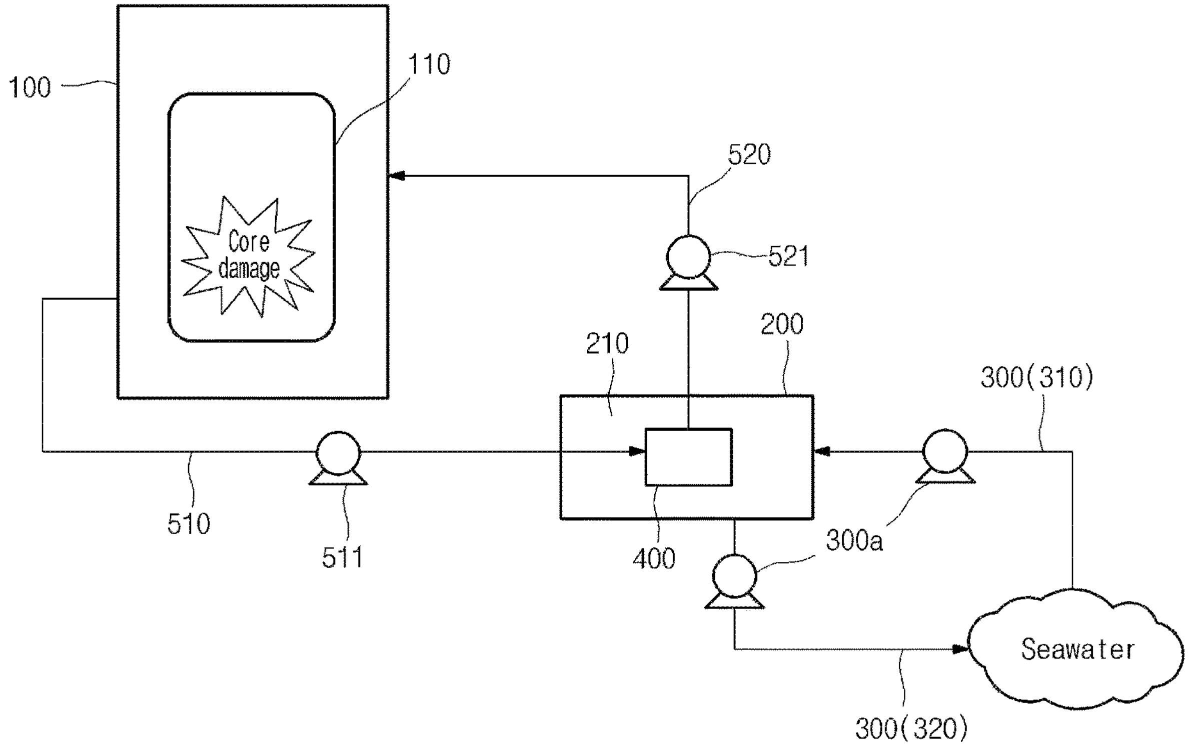
FIG. 1 is a schematic configuration diagram of a reactor cooling system for cooling down a reactor damaged by a disaster accident according to an exemplary embodiment of the present disclosure.

As shown in FIG. 1, the reactor cooling system for cooling down a reactor damaged by a disaster accident includes a nuclear power generation facility 100, a seawater storage tank 200, a seawater flow path 300, a heat exchanger 400, and a contaminated water flow path 500.

The nuclear power generation facility is a generic term for a nuclear reactor, a reactor containment facility in which the nuclear reactor is installed, and the like, and here, detailed descriptions thereof will be omitted.

The seawater storage tank 200 is provided with a water storage space 210 to store seawater. On one side of the seawater storage tank 200, an inflow portion (not shown), which is a flow path through which seawater may flow into the water storage space 210, is provided, and on another side of the seawater storage tank 20, a discharge portion (not shown), which is a flow path through which the seawater may be discharged to the sea, is provided.

The seawater flow path 300 is a flow path for circulating the seawater of the sea and the seawater of the seawater storage tank 200 and is installed at each of the inflow portion and the discharge portion. The seawater flow path 300 includes a seawater inflow flow path 310 installed at the inflow portion of the seawater storage tank 200 to provide a pipeline for introducing seawater into the seawater storage tank 200 and a seawater discharge flow path 320 installed at the discharge portion of the seawater storage tank 200 to provide a pipeline for discharging seawater to the sea. At this time, a seawater pump 300*a* is installed in the seawater flow path 300, thereby performing an operation of seawater inflow and seawater discharge.

The heat exchanger 400 serves to exchange heat between high-temperature contaminated water and seawater generated at the nuclear power generation facility 100 when a severe accident (extreme disaster accident) occurs and is installed in the water storage space 210 of the seawater storage tank 200. The heat exchanger 400 is configured to allow the high-temperature contaminated water to be heat-exchanged inside the water storage space 210 of the seawater storage tank 200 and to export the contaminated water to the nuclear power generation facility 100, and the present disclosure is to allow the contaminated water to be used as a cooling water source for cooling the nuclear power generation facility 100. The heat exchanger 400 may be installed so as to be immersed in the water storage space 210 of the seawater storage tank 200 and configured to be stacked with a plurality of folds.

The heat exchanger 400 will be described in detail with reference to FIG. 2. As described above, the plurality of the folds of the heat exchanger 400 is stacked inside a plate (401) and are installed at an inclined angle with respect to a bottom part of the seawater storage tank 200. That is, as shown in FIG. 2, the heat exchanger 400 is configured in a zigzag integral type when viewed from a side but is configured to be provided with an inclination angle with each other. As the plurality of the folds of the heat exchanger 400 is stacked, even when the heat exchanger 400 is installed in the water storage space 210 of a limited size, the length of the heat exchanger flow path 410 may be maximized, thereby allowing the high-temperature contaminated water to be heat-exchanged with the seawater. In addition, as the plurality of the folds of the heat exchanger 400 is configured to incline, the contaminated water flowing inside the heat exchanger 400 may smoothly flow from a top part to a bottom of the heat exchanger 400. That is, the present disclosure increases the heat exchange efficiency of the contaminated water and allows the contaminated water to fall freely from a most top part to the bottom part of the heat exchanger 400 and to be transported. As having the plurality of the folds configured to incline, the heat exchanger 400 may be effectively utilized.

Meanwhile, the heat exchanger flow path 410 may be provided with a plurality of pipelines covered with the plate (401) inside the heat exchanger 400 and may be provided in a manifold type branched off from one pipeline. The heat exchange flow path 410 at the most top part of the heat exchanger 400 is connected to and branched off from a contaminated water supply flow path to be described later, and the heat exchange flow path 410 branched off is connected to the contaminated water discharge flow path to be described later at a most bottom part of the heat exchanger 400 as a single pipeline. The heat exchanger flow path 410 is provided as the plurality of pipelines each of which is straight. Accordingly, the heat exchanger flow path 410 may increase the flow efficiency and the heat exchange efficiency of the contaminated water therein.

The contaminated water flow path 500 is provided with pipelines through which the high-temperature contaminated water generated at the nuclear power generation facility 100 after the accident flows into the heat exchanger 400 and pipelines through which the contaminated water, heat exchanged through the heat exchanger 400, is discharged to the nuclear power generation facility. That is, the contaminated water flow path 500 constitutes a circulation flow path between the nuclear power generation facility 100 and the heat exchanger 400. The contaminated water flow path 500 includes a contaminated water supply flow path 510 installed between the nuclear power generation facility 100 and the heat exchanger flow path 410 at the most top part of the heat exchanger 400 to supply contaminated water to the heat exchanger 400 and a contaminated water discharge flow path 520 installed between the heat exchanger flow path 410 at the most bottom part of the heat exchanger 400 and the nuclear power generation facility 100 to discharge the contaminated water heat-exchanged to the nuclear power generation facility 100. At this time, a pumping means 521 is installed in the contaminated water discharge flow path 520 to provide pumping force for discharging the contaminated water in the heat exchanger 400 to the nuclear power generation facility 100. The pumping means 521 may be a pump installed in a fixed manner in the contaminated water discharge flow path 520 or may be a movable pump. In addition, a sprinkler (not shown) may be installed in the contaminated water discharge flow path 520, thereby allowing the nuclear power generation facility 100 to be effectively cooled when the contaminated water is sprayed. In addition, a pumping means 511 may also be installed in the contaminated water supply flow path 510 for smoothly supplying the contaminated water generated at the nuclear power generation facility 100 to the heat exchanger 400.

Hereinafter, a reactor cooling method using the reactor cooling system for cooling down a reactor damaged by a disaster accident configured as described above will be described with reference to FIG. 3 attached hereto.

A manager operates the seawater pump 300*a* to store seawater in the seawater storage tank 200 in which the heat exchanger 400 are installed in S100. At this time, the heat exchanger 400 become a state of being immersed in seawater in the water storage space 210.

In such a state, when a severe accident including an extreme disaster accident occurs in the nuclear power generation facility 100, the manager discharges the high-temperature contaminated water generated at the nuclear power generation facility 100 from the nuclear power generation facility 100 in S200. That is, the manager supplies the contaminated water generated at the nuclear power generation facility 100 to the heat exchanger 400 through the contaminated water supply flow path 510. The high-temperature contaminated water flows into the heat exchanger 400 through an uppermost heat exchanger flow path 410 and then falls freely along the inclined straight pipe heat exchanger flow path 410. At this time, while falling along a zigzag flow path, the high-temperature contaminated water is heat-exchanged with seawater in the water storage space 210 in S300. The heat exchanger flow path 410 in the zigzag type may increase the heat exchange efficiency of the contaminated water by increasing the heat exchange time for the contaminated water. At this time, in a process of heat exchange of the contaminated water in the heat exchanger, the seawater in the water storage space 210 and seawater in the sea are continuously circulated through the seawater pump 300*a*.

Thereafter, the contaminated water (cooling water) whose temperature is lowered by being heat-exchanged with seawater is discharged to the contaminated water discharge flow path 520 through the pumping means 521 and then discharged to the nuclear power generation facility 100 in S400. At this time, the contaminated water heat-exchanged of the nuclear power generation facility 100 functions as cooling water and is sprayed into the nuclear reactor through a sprinkler.

Thereafter, the nuclear power generation facility 100 is operated to be cooled through the contaminated water in S500.

At this time, the temperature, of the contaminated water as cooling water, rises in the process of cooling the high-temperature nuclear power generation facility, in S600, and such high-temperature contaminated water is mixed with the high-temperature contaminated water continuously generated at the nuclear power generation facility 100 and is supplied again to the heat exchanger 400 in S200.

Through such a series of circulation processes, a cooling action of the nuclear power generation facility is continuously performed.

As described so far, the reactor cooling system for cooling down a reactor damaged by a disaster accident and the reactor cooling method using the same according to the present disclosure recycles the contaminated water as the cooling water source for cooling the nuclear power generation facility after the accident. That is, in a state in which the boundary between the high-temperature contaminated water generated at the nuclear power generation facility and the seawater in the seawater storage tank is separated by the heat exchanger installed in the seawater storage tank, the present disclosure performs the heat exchange of the contaminated water and passes the contaminated water through the nuclear power generation facility and the heat exchanger, thereby allowing the cooling action for the nuclear power generation facility to be achieved. Accordingly, the present disclosure may prevent environmental pollution and prevent disputes with neighboring countries by maximally suppressing the discharge of the contaminated water into the sea.

Although the present disclosure has been described in detail with respect to the described embodiments, it is obvious to those skilled in the art that various changes and modifications are possible within the scope of the technical spirit of the present disclosure, and it should be understood that such changes and modifications belong to the appended claims.

The invention claimed is:

1. A reactor cooling system for cooling down a reactor damaged by a disaster accident, the system comprising:

a nuclear power generation facility (100);

a seawater storage tank (200) provided with a water storage space to store seawater;

a seawater inflow flow path (310) provided with a pipeline for introducing the seawater into the seawater storage tank (200) and a seawater discharge flow path (320) provided with a pipeline for discharging the seawater from the seawater storage tank (200) to the sea, the seawater inflow flow path (310) and the seawater discharge flow path (320) being connected to one end and another end of the seawater storage tank (200), respectively;

a heat exchanger (400) installed in the water storage space of the seawater storage tank (200);

a contaminated water supply flow path (510) provided with a pipeline for transferring contaminated water generated at the nuclear power generation facility (100) after the accident to the heat exchanger (400) therethrough; and a contaminated water discharge flow path (520) between the heat exchanger (400) and the nuclear power generation facility (100) provided with a pipeline for discharging the contaminated water, heat-exchanged with the seawater inside the seawater storage tank, to the nuclear power generation facility (100), wherein:

the heat exchanger (400) is stacked in the vertical direction in the seawater storage tank (200) and includes a plurality of heat exchanger flow paths (410) arranged in parallel with one another between the contaminated water supply flow path (510) and the contaminated water discharge flow path (520), the plurality of heat exchanger flow paths (410) being configured to transfer the contaminated water generated at the nuclear power generation facility (100);

the heat exchanger (400) further includes a plate (401) configured to enclose the plurality of heat exchanger flow paths (410) so as to prevent the contaminated water from being exposed to the seawater and the heat exchanger (400) is further configured to allow the contaminated water to fall freely along the plurality of heat exchanger flow paths (410) in enclosed inside the plate (401);

the plate (401) and the plurality of heat exchanger flow paths (410) are integrally provided in a zigzag pattern such that each of the heat exchanger flow paths are inclined with respect to a bottom part of the seawater storage tank (200), to increase contact areas between the contaminated water and the seawater through the heat exchanger (400); and the system further comprises a pumping means (521) installed in the contaminated water discharge flow path (520) to provide pumping force for discharging the contaminated water in the heat exchanger (400) to the nuclear power generation facility (100) to cool the nuclear power generation facility (100) after the accident.

2. The system of claim 1, wherein the contaminated water generated at the nuclear power generation facility circulates through the nuclear power generation facility and the heat exchanger, and the seawater circulates through the sea and the seawater storage tank.

* * * * *